United States Patent
Yoo et al.

(10) Patent No.: US 8,639,117 B2
(45) Date of Patent: Jan. 28, 2014

(54) APPARATUS AND METHOD FOR ALLOCATING DYNAMIC BANDWIDTH

(75) Inventors: Hark Yoo, Gwangju (KR); Geun Yong Kim, Goyang-si (KR); Youngsuk Lee, Gwangju (KR); Sung Chang Kim, Gwangju (KR); Jong Deog Kim, Daejeon (KR); Dongsoo Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 12/941,475

(22) Filed: Nov. 8, 2010

(65) Prior Publication Data

US 2011/0129223 A1 Jun. 2, 2011

(30) Foreign Application Priority Data

Nov. 30, 2009 (KR) .................. 10-2009-0116855

(51) Int. Cl.
  *H04J 14/00* (2006.01)
(52) U.S. Cl.
  USPC .................. 398/58; 398/98; 398/99; 398/100
(58) Field of Classification Search
  USPC .......................................... 398/98
  See application file for complete search history.

(56) References Cited

U.S. PATENT DOCUMENTS

| 8,184,977 | B2* | 5/2012 | Kazawa et al. | 398/72 |
| 2003/0048805 | A1* | 3/2003 | Yoshihara et al. | 370/468 |
| 2003/0081626 | A1* | 5/2003 | Naor et al. | 370/431 |
| 2004/0146301 | A1* | 7/2004 | Choi et al. | 398/58 |
| 2007/0133988 | A1* | 6/2007 | Kim et al. | 398/69 |
| 2009/0269072 | A1* | 10/2009 | Liaw et al. | 398/98 |
| 2010/0221006 | A1* | 9/2010 | Yoon et al. | 398/58 |
| 2011/0150463 | A1* | 6/2011 | Zhou et al. | 398/25 |

FOREIGN PATENT DOCUMENTS

| KR | 10-2004-0048102 |   | 6/2004 |
| KR | 10-2005-0118390 | A | 12/2005 |

OTHER PUBLICATIONS

"Efficient medium arbitration of FSAN-compliant GPONs"; Int. J. Commun. Syst., vol. 19, Issue 5; pp. 603-617, Jun. 2006.

* cited by examiner

*Primary Examiner* — Nathan Curs
*Assistant Examiner* — Tanya Ngo
(74) *Attorney, Agent, or Firm* — Kile Park Reed & Houtteman PLLC

(57) ABSTRACT

A dynamic bandwidth allocation apparatus of a passive optical network detects guarantee agreement information of each transmission container (T-CONT) queue of at least one optical network unit (ONU) that is connected to the dynamic bandwidth allocation apparatus in order to dynamically allocate a bandwidth is provided. The dynamic bandwidth allocation apparatus sets a queue threshold according to a buffer size of each T-CONT queue of at least one ONU, and calculates a service level agreement (SLA) parameter of at least one ONU using guarantee agreement information and a queue threshold. The dynamic bandwidth allocation apparatus allocates a bandwidth for every frame of each ONU using each SLA parameter of at least one ONU.

9 Claims, 4 Drawing Sheets

APPARATUS AND METHOD FOR ALLOCATING DYNAMIC BANDWIDTH

CROSS-REFERENCE TO RELATED APPLICATION

This application claims priority to and the benefit of Korean Patent Application No. 10-2009-0116855 filed in the Korean Intellectual Property Office on Nov. 30, 2009, the entire contents of which are incorporated herein by reference.

BACKGROUND OF THE INVENTION (a) Field of the Invention

The present invention relates to a method and apparatus for allocating dynamic bandwidth. More particularly, the present invention relates to a method and apparatus for allocating dynamic bandwidth that can allocate bandwidth in consideration of queue size information of an optical network unit.

(b) Description of the Related Art

Optical access network technology is technology for effectively providing a necessary bandwidth for subscribers in the first mile, and usually has a point-to-point or a point-to-multipoint structure. In general, a point-to-point structure is used for an active optical network and a point-to-multipoint structure is mainly used for a passive optical network, and they are standardized in international standard organizations such as the Institute of Electrical and Electronics Engineers (IEEE) and the International Telecommunication Union Telecommunication Standardization Sector (ITU-T).

A passive optical network (PON) has a tree structure in which an optical line terminal (OLT) of a telephone office corresponds at 1-to-N to a plurality of optical network units (ONU) through a passive element.

In downward transmission in such a PON, because data transmitting from the OLT are broadcasted in all ONUs, a problem of medium sharing does not occur. However, because a plurality of ONUs are connected to an OLT through one optical fiber, in order to perform upward transmission without collision between ONUs, a time division multiple access medium access control (TDMA MAC) protocol for accessing a medium while avoiding overlapping of time is required.

Particularly, in a gigabit passive optical network (hereinafter referred to as a "GPON") standard that is set at the ITU-T, in order to receive traffic of various characteristics, each ONU has a class queue (hereinafter referred to as a "T-CONT queue") of a separate transmission container (T-CONT) on a service class basis and stores and transmits upward data on a priority order basis.

When a service level agreement (SLA) parameter for a class queue is set in such an ONU, a T-CONT queue of the ONU should store packets that are input for a predetermined allocation cycle. When the size of the T-CONT queue is insufficient to store packets that are input for an allocation cycle, packet drop occurs.

Therefore, when an SLA parameter is set in the OLT, technology for allocating a bandwidth in consideration of a buffer size of a T-CONT queue of each ONU is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for allocating a dynamic bandwidth having advantages of allocating a bandwidth in consideration of a buffer size of a transmission container (T-CONT) queue of an optical network unit (ONU).

An exemplary embodiment of the present invention provides a method of allocating a dynamic bandwidth in a dynamic bandwidth allocation apparatus for a passive optical network (PON), the method including: detecting guarantee agreement information of each T-CONT queue of at least one ONU that is connected to the dynamic bandwidth allocation apparatus; setting a queue threshold according to a buffer size of each T-CONT queue of the at least one ONU; calculating a service level agreement (SLA) parameter of the at least one ONU using the guarantee agreement information and the queue threshold; and allocating a bandwidth for every frame of each ONU using each SLA parameter of the at least one ONU.

Another embodiment of the present invention provides a dynamic bandwidth allocation apparatus that is connected to at least one ONU in a PON, including: an SLA parameter setting unit that detects guarantee agreement information from each T-CONT queue of the at least one ONU and that receives a queue threshold of a T-CONT queue of the at least one ONU and that calculates an SLA parameter of the at least one ONU using the guarantee agreement information and the queue threshold; a bandwidth allocation unit that receives each SLA parameter of the at least one ONU to allocate a bandwidth for every frame of a corresponding ONU; and an ONU queue size setting unit that sets, when newly registering the at least one ONU, a queue threshold of each ONU according to information of a priority-queue on a T-CONT queue basis.

DETAILED DESCRIPTION OF THE EMBODIMENTS

Figure 1:
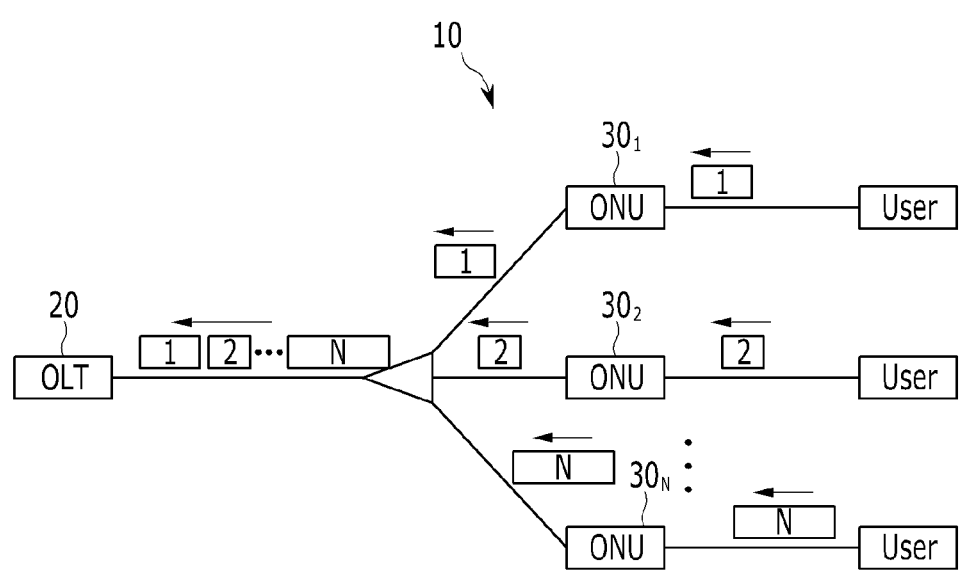
FIG. 1 is a block diagram illustrating a general PON.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

FIG. 1 is a block diagram illustrating a general PON.

As shown in FIG. 1, a general passive optical network (hereinafter referred to as a "PON") 10 includes an optical line terminal (hereinafter referred to as an "OLT") 20 of a telephone office, and a plurality of optical network units (hereinafter referred to as an "ONU") $30_1$-$30_N$.

The OLT 20 is connected in a tree structure corresponding at 1-to-N to a plurality of ONUs $30_1$-$30_N$. When the OLT 20 is a GPON that is set at the ITU-T, the OLT 20 collects standby state information of a class queue (hereinafter referred to as a "T-CONT queue") of a transmission container (T-CONT) of the ONUs $30_1$-$30_N$ in which the OLT 20 manages and that operates in all links, and allocates an upward bandwidth on a T-CONT queue basis based on the standby state information.

The ONUs $30_1$-$30_N$ include a separate T-CONT queue on a service basis, and store and transmit upward data on a priority order basis.

In order for the OLT 20 to support a voice service having a strict time delay condition, the OLT 20 instructs each of the ONUs $30_1$-$30_N$ to transmit data of a fixed short frame (e.g., 125 us) to receive upward data.

For example, when one T-CONT queue is allocated to a subscriber and the subscriber has agreed to receive a service of a guarantee bandwidth of 32 Mbps and a transmission delay guarantee time of maximum 2 ms for the T-CONT queue, the OLT 20 calculates a service level agreement (hereinafter referred to as an "SLA") parameter satisfying Equations 1 and 2 and allocates a bandwidth. Here, an SLA parameter includes an allocation cycle (frame).

Transmission delay guarantee time=2*allocation cycle (frame)+processing delay time    (Equation 1)

Guarantee bandwidth(bps)=8*maximum allocation band(byte)/125 us*allocation cycle(frame)    (Equation 2)

Specifically, when a "processing delay time" is "0", a "transmission delay guarantee time" is "2 ms", and when the "transmission delay guarantee time" of 2 ms is applied to Equation 1, an "allocation cycle (frame)" becomes "1 ms". Here, because a GPON is "125 us" per frame, a frame for an "allocation cycle (frame)", i.e., an "allocation cycle (frame)" becomes 8 frames by "1 ms/125 us". A "guarantee bandwidth (bps)" is "32 Mbps" and an "allocation cycle (frame)" is 8 frames, and thus when the "guarantee bandwidth (bps)" of 32 Mbps and the "allocation cycle (frame)" of 8 frames are applied to Equation 2, a "maximum allocation bandwidth (byte)" of "4000 bytes" is allocated to every 8 frames and thus a service of "32 Mbps" is provided.

In this way, when an SLA parameter for a T-CONT queue of each of the ONUs $30_1$-$30_N$ is set, the T-CONT queue of the ONUs $30_1$-$30_N$ stores packets that are input for a predetermined allocation cycle. However, when a buffer size of the T-CONT queue is insufficient to store packets that are input for an allocation cycle, packet drop occurs. That is, even if a "guarantee bandwidth (bps)" of packets that are input to the T-CONT queue of each of the ONUs $30_1$-$30_N$ is "32 Mbps", when a buffer size of a corresponding T-CONT queue is smaller than space to store 4000 bytes, there is a problem that a packet drop occurs.

Therefore, in order to improve efficiency of a network and guarantee transmission quality, in consideration of SLA information of each T-CONT queue of the ONUs $30_1$-$30_N$ and a buffer size of the T-CONT queue of each of the ONUs $30_1$-$30_N$, a method of performing dynamic bandwidth allocation (hereinafter referred to as a "DBA") for every frame is requested.

Hereinafter, a method and apparatus for allocating a dynamic bandwidth that allocate a bandwidth in consideration of a buffer size of each T-CONT queue according to an exemplary embodiment of the present invention will be described in detail with reference to FIGS. 2 to 4.

Figure 2:
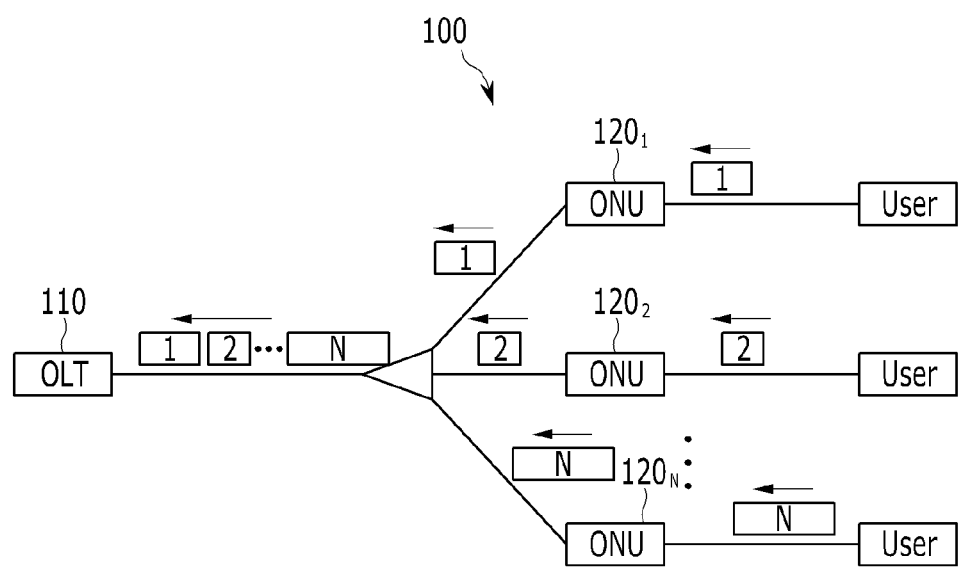
FIG. 2 is a block diagram illustrating a PON according to an exemplary embodiment of the present invention.

FIG. 2 is a block diagram illustrating a PON according to an exemplary embodiment of the present invention. FIG. 3 is a block diagram illustrating a dynamic bandwidth allocation apparatus of a PON that is shown in FIG. 2.

Figure 3:
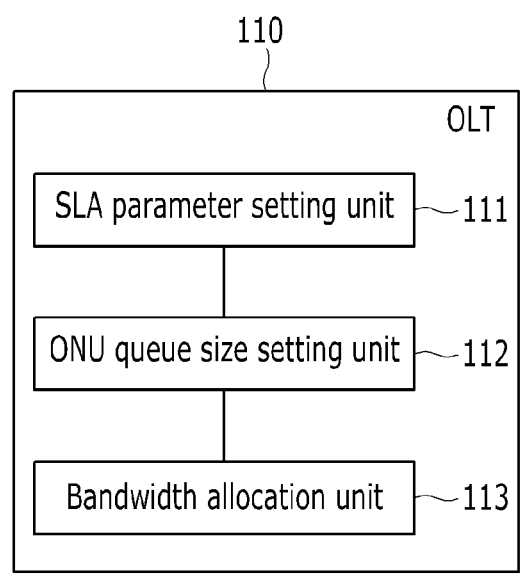
FIG. 3 is a block diagram illustrating a dynamic bandwidth allocation apparatus of a PON that is shown in FIG. 2.

Referring to FIGS. 2 and 3, a PON 100 according to an exemplary embodiment of the present invention includes an optical line terminal (hereinafter referred to as an "OLT") 110 and optical network units (hereinafter referred to as an "ONUs") $120_1$-$120_N$.

The OLT 110 is a dynamic bandwidth allocation apparatus that allocates a bandwidth in consideration of a buffer size of each of the ONUs $120_1$-$120_N$, and includes an SLA parameter setting unit 111, an ONU queue size setting unit 112, and a bandwidth allocation unit 113.

The SLA parameter setting unit 111 detects guarantee agreement information corresponding to each T-CONT queue of the ONUs $120_1$-$120_N$ from SLA information of a T-CONT queue of each of the ONUs $120_1$-$120_N$. Here, the guarantee agreement information includes a guarantee bandwidth and transmission delay guarantee time information. The SLA information according to an exemplary embodiment of the present invention is set by a service provider based on a service providing content that is agreed when a user subscribes to the PON 100. The SLA parameter setting unit 111 receives a threshold (hereinafter referred to as a "queue threshold") that is determined according to a buffer size of each T-CONT queue of the ONUs $120_1$-$120_N$ from the ONU queue size setting unit 112. The SLA parameter setting unit 111 calculates an SLA parameter on a T-CONT queue basis using a queue threshold of each T-CONT queue of the ONUs $120_1$-$120_N$ and guarantee agreement information corresponding to each T-CONT queue.

When newly registering the ONU, the ONU queue size setting unit 112 collects drop threshold information (e.g., 2 bytes) of a priority-queue on a T-CONT queue basis through an ONT management and control interface (OMCI) before allocating an identifier, thereby setting a queue threshold of the corresponding T-CONT queue. Specifically, when one priority-queue is connected to the corresponding T-CONT queue, the ONU queue size setting unit 112 sets the collected drop threshold value as a queue threshold of the corresponding T-CONT queue. When at least two priority-queues are connected to the T-CONT queue, the ONU queue size setting unit 112 sets a value in which a proportional constant is multiplied by the total sum of drop thresholds of each priority-queue as a queue threshold of the corresponding T-CONT queue. That is, the ONU queue size setting unit 112 sets a queue threshold according to a buffer size of the T-CONT queue.

The bandwidth allocation unit 113 receives each SLA parameter of the ONUs $120_1$-$120_N$ from the SLA parameter setting unit 111, and allocates a bandwidth for every frame of a corresponding ONU by applying an SLA parameter equation to the received each SLA parameter of the ONUs $120_1$-$120_N$.

The ONUs $120_1$-$120_N$ include a separate T-CONT queue on a service basis, and store and transmit upward data on a priority order basis.

Figure 4:
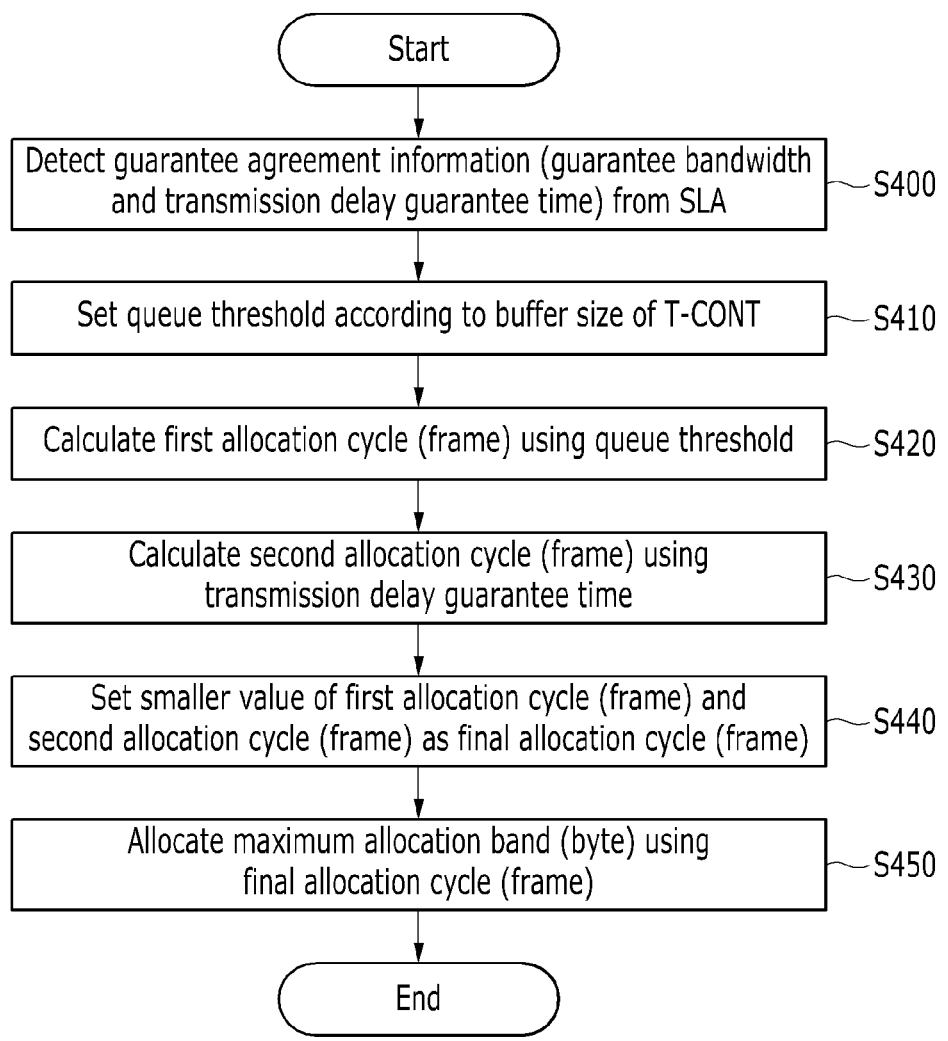
FIG. 4 is a flowchart illustrating a method of allocating a bandwidth in a dynamic bandwidth allocation apparatus according to an exemplary embodiment of the present invention.

FIG. 4 is a flowchart illustrating a method of allocating bandwidth in a dynamic bandwidth allocation apparatus according to an exemplary embodiment of the present invention.

Referring to FIGS. 3 and 4, in an exemplary embodiment of the present invention, it is assumed that one T-CONT queue having a queue threshold of 3500 bytes is allocated to the ONU $120_1$ of the ONUs $120_1$-$120_N$, and a user of the ONU $120_1$ agrees to an SLA with a guarantee bandwidth of 32 Mbps and a transmission delay guarantee time of 2 ms.

The SLA parameter setting unit 111 of the OLT 110 detects guarantee agreement information corresponding to a T-CONT of the ONU $120_1$ from SLA information that is agreed to by the user of the ONU $120_1$. That is, the SLA parameter setting unit 111 detects a guarantee bandwidth of 32 Mbps from the SLA information and transmission delay guarantee time information of 2 ms (S400).

The ONU queue size setting unit 112 sets a queue threshold to 3500 bytes according to a buffer size of a T-CONT queue of the ONU $120_1$. The ONU queue size setting unit 112 transfers a predetermined queue threshold to the SLA parameter setting unit 111 (S410).

The SLA parameter setting unit 111 calculates an SLA parameter satisfying Equations 3 to 5 using a queue threshold of a T-CONT queue of the ONU $120_1$ and transmission delay guarantee time information of 2 ms and a guarantee bandwidth of 32 Mbps corresponding to the T-CONT queue. Here, the SLA parameter includes a first allocation cycle (frame), a second allocation cycle (frame), and a final allocation cycle (frame).

First allocation cycle(frame)=Floor[proportional constant*(queue threshold/average transmission byte per frame)] (Equation 3)

Second allocation cycle(frame)=Floor[(transmission delay guarantee time/2)−processing delay time] (Equation 4)

Final allocation cycle(frame)=min[first allocation cycle(frame), second allocation cycle(frame)] (Equation 5)

In Equations 3 to 5, Floor [X] is the largest constant that is not larger than X.

Specifically, because a "guarantee bandwidth" is "32 Mbps" and in a GPON, a frame is "125 us", the SLA parameter setting unit 111 calculates a "transmission bytes-per-frame" of "500 bytes". The SLA parameter setting unit 111 sets a "proportional constant" as "1" and applies a "transmission bytes-per-frame" of the calculated "500 bytes" to Equation 3, thereby calculating "the first allocation cycle (frame)". That is, the SLA parameter setting unit 111 calculates "a first allocation cycle (frame)" of 7 frames by dividing a "queue threshold" of "3,500 bytes" by a "transmission bytes-per-frame" of "500 bytes" (S420).

The SLA parameter setting unit 111 assumes a "processing delay time" as "0", and applies a "transmission delay guarantee time" of "2 ms" to Equation 4, and thus calculates "a second allocation cycle (frame)" and thus "the second allocation cycle (frame)" becomes 8 frames (S430). That is, when dividing a "transmission delay guarantee time" of "2 ms" by "2", the "transmission delay guarantee time becomes "1 ms", and in the GPON, because a frame is "125 us", "the second allocation cycle (frame)" becomes 8 frames.

The SLA parameter setting unit 111 sets 7 frames, which is a smaller value of "a first allocation cycle (frame)" of 7 frames and "a second allocation cycle (frame)" of 8 frames as a "final allocation cycle (frame)", as in Equation 5 (S440).

Because a "guarantee bandwidth (bps)" is "32 Mbps" and a "final allocation cycle (frame)" is 7 frames, the bandwidth allocation unit 113 allocates a bandwidth of "3500 bytes" to a "maximum allocation band (byte)" in every 7 frames by the SLA parameter equation of Equation 6 and thus provides a service of "32 Mbps". That is, the SLA parameter setting unit 111 guarantees a "maximum allocation band (byte)" of "3500 bytes" per cycle in consideration of a "queue threshold" of "3500 bytes" of the ONU $120_1$ that is set according to a buffer size of a T-CONT queue and a "transmission delay guarantee time" of "2 ms", thereby providing an SLA service (S450).

Guarantee bandwidth(bps)=8*maximum allocation band(byte)/125 us*maximum allocation cycle (frame) (Equation 6)

Here, Floor [X] is the largest constant that is not larger than X.

That is, in a method of calculating a general SLA parameter (see the description of FIG. 1), because a service is provided using an "allocation cycle (frame)" of "8 frames" and a "maximum allocation band (byte) per cycle" of "4000 bytes" by Equations 1 and 2, when a "queue threshold" of a corresponding ONU is "3500 bytes", space of a buffer to store a "maximum allocation band (byte)" per cycle of "4000 bytes" is insufficient and thus packet drop may occur, and in an exemplary embodiment of the present invention, an SLA service is provided by allocating a "maximum allocation band (byte) per cycle" in consideration of a "queue threshold" that is set according to a buffer size and a "transmission delay guarantee time" of a corresponding ONU, thereby preventing a packet drop phenomenon.

In an exemplary embodiment of the present invention, in Equation 3, a "proportional constant" is set as "1", but the proportional constant is not limited thereto, and a value between "0" and "1" may be used in consideration of burst characteristics of input traffic and addition input packet by processing delay time. For example, if "0.6" is used as a "proportional constant", "4.8" is calculated as a "first allocation cycle (frame)", and the largest constant that is not over "the first allocation cycle (frame)" becomes "4 frames". Accordingly, a "final allocation cycle (frame)" becomes "4 frames" and a "maximum allocation band (byte)" per cycle becomes "2000 bytes", and thus an SLA service can be provided by the same succeeding process.

In this way, the OLT 110 according to an exemplary embodiment of the present invention dynamically allocates a bandwidth in consideration of a queue threshold and SLA information that are set according to a buffer size of the ONU, and thus a packet drop phenomenon that occurs by restriction of a buffer size of the ONU can be prevented.

According to an exemplary embodiment of the present invention, by dynamically allocating a bandwidth in consideration of a queue threshold and SLA information that are set according to a buffer size of an ONU, packet drop due to restriction of a buffer size can be prevented.

Further, according to an exemplary embodiment of the present invention, by dynamically allocating a bandwidth using a queue threshold that is set according to a buffer size of an ONU, a starving phenomenon occurring when interlocking an ONU and a dynamic bandwidth allocation apparatus that are produced in different equipment companies can be previously prevented.

An exemplary embodiment of the present invention that is described above may not only be embodied through an apparatus and method, but may also be embodied through a program that implements a function corresponding to a configuration of the exemplary embodiment of the present invention or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating a dynamic bandwidth in a dynamic bandwidth allocation apparatus for a passive optical network (PON), the method comprising:

detecting guarantee agreement information of a transmission container (T-CONT) queue of at least one optical network unit (ONU) that is connected to the dynamic bandwidth allocation apparatus;

setting a queue threshold according to a buffer size of the T-CONT queue of the at least one ONU;

calculating a service level agreement (SLA) parameter of the at least one ONU using the guarantee agreement information and the queue threshold; and allocating a bandwidth for each frame of a plurality of frames of the at least one ONU using the SLA parameter of the at least one ONU, wherein the setting of a queue threshold comprises:

collecting, when newly registering the at least one ONU, drop threshold value information of a priority-queue on a T-CONT queue basis;

setting, when one priority-queue is connected to the T-CONT queue, a drop threshold value as a queue threshold of a corresponding T-CONT queue; and setting, when at least two priority-queues are connected to the T-CONT queue, a value in which a constant is multiplied by a total sum of the drop threshold values of each priority-queue as a queue threshold of a corresponding T-CONT queue, wherein the constant comprises a value greater than 0 and less than or equal to 1.

2. The method of claim 1, wherein the guarantee agreement information comprises a guarantee bandwidth and transmission delay guarantee time information corresponding to the T-CONT queue of the at least one ONU.

3. The method of claim 2, wherein the calculating of an SLA parameter comprises:

calculating a first allocation cycle using each queue threshold and a transmission byte per frame of the ONU;

calculating a second allocation cycle using the transmission delay guarantee time information and processing delay time information; and selecting a smaller value of the first allocation cycle and the second allocation cycle and setting the selected smaller value as a final allocation cycle.

4. The method of claim 3, wherein the allocating of a bandwidth for each frame comprises:

allocating a bandwidth for every frame using the guarantee bandwidth and the final allocation cycle.

5. A dynamic bandwidth allocation apparatus that is connected to at least one optical network unit (ONU) in a passive optical network (PON), comprising:

a service level agreement (SLA) parameter setting unit that detects guarantee agreement information from a transmission container (T-CONT) queue of the at least one ONU and that receives a queue threshold of the T-CONT queue of the at least one ONU, and that calculates an SLA parameter of the at least one ONU using the guarantee agreement information and the queue threshold;

a bandwidth allocation unit that receives the SLA parameter of the at least one ONU to allocate a bandwidth for each frame of a plurality of frames of a corresponding ONU; and an ONU queue size setting unit that sets, when newly registering the at least one ONU, a queue threshold of the at least one ONU according to information of a priority-queue on a T-CONT queue basis, wherein the ONU queue size setting unit sets, when one priority-queue is connected to each T-CONT queue, a drop threshold value of the priority-queue as a queue threshold of a corresponding T-CONT queue, and sets, when at least two priority-queues are connected to the T-CONT queue, a value in which a constant is multiplied by a total sum of drop threshold values of the priority-queue as a queue threshold of a corresponding T-CONT queue, wherein the constant comprises a value greater than 0 and less than or equal to 1.

6. The dynamic bandwidth allocation apparatus of claim 5, wherein the guarantee agreement information comprises a guarantee bandwidth and transmission delay guarantee time information corresponding to the T-CONT queue of the at least one ONU.

7. The dynamic bandwidth allocation apparatus of claim 6, wherein the SLA parameter setting unit calculates a first allocation cycle using the queue threshold and a transmission byte per frame of the at least one ONU, calculates a second allocation cycle using the transmission delay guarantee time information and processing delay time information, and selects a smaller value of the first allocation cycle and the second allocation cycle and sets the selected smaller value as a final allocation cycle.

8. The dynamic bandwidth allocation apparatus of claim 7, wherein the bandwidth allocation unit allocates a bandwidth for each frame of a corresponding ONU using the guarantee bandwidth and the final allocation cycle.

9. The dynamic bandwidth allocation apparatus of claim 5, wherein the queue threshold is determined according to a buffer size of the T-CONT queue.

* * * * *